Figure 1:
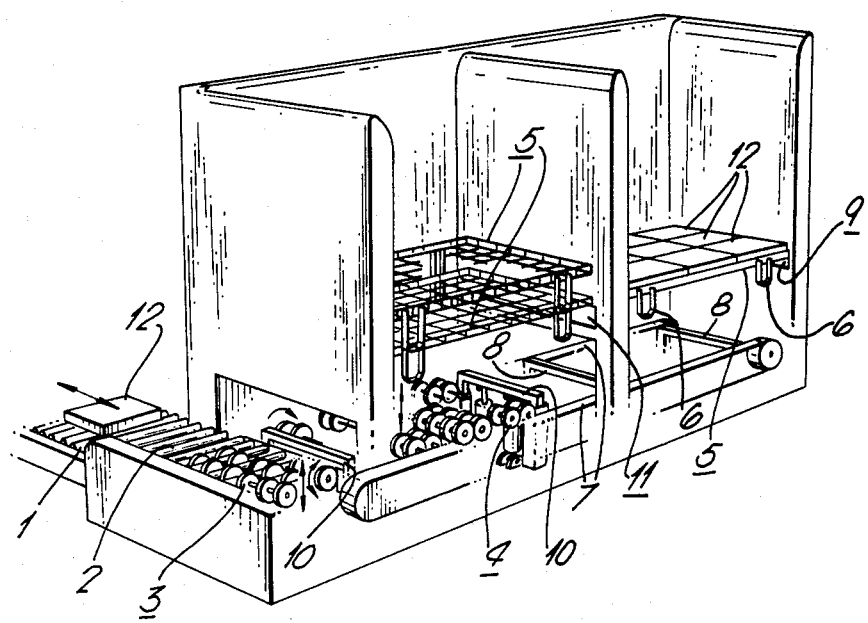

United States Patent [19]

Saarinen

[11] Patent Number: 4,642,014
[45] Date of Patent: Feb. 10, 1987

[54] FRAMING SYSTEM

[75] Inventor: Kari Saarinen, Säkylä, Finland

[73] Assignee: Lännen Tehtaat Oy, Iso-Vimma, Finland

[21] Appl. No.: 716,168

[22] Filed: Mar. 26, 1985

[30] Foreign Application Priority Data

Mar. 27, 1984 [FI] Finland ................................ 841212

[51] Int. Cl.⁴ ...................... A01G 9/02; B65G 57/30
[52] U.S. Cl. .......................................... 414/96; 47/86;
53/536; 193/35 SS; 414/101; 414/110;
414/786; 198/465.1
[58] Field of Search ...................... 414/32, 45, 96, 101,
414/110, 417, 786; 198/465.1, 782; 53/536;
193/35 SS; 47/1 A, 73, 77, 85, 86; 111/3

[56] References Cited

U.S. PATENT DOCUMENTS

| | | |
|---|---|---|
| 2,744,372 | 5/1956 | Cleaveland et al. ............ 414/32 X |
| 2,825,193 | 3/1958 | Loveridge ............................. 53/536 |
| 2,830,416 | 4/1958 | Edwards et al. ..................... 53/536 |
| 3,171,550 | 3/1965 | Gajdostik et al. ................ 414/96 X |
| 3,528,576 | 9/1970 | Runyan et al. ..................... 414/417 |
| 3,675,801 | 7/1972 | Larson et al. ...................... 414/417 |
| 3,889,416 | 6/1975 | Bergeron et al. ..................... 47/86 |
| 3,895,477 | 7/1975 | Yamashita ............................ 414/32 |
| 4,251,951 | 2/1981 | Heinstedt ............................... 47/77 |

FOREIGN PATENT DOCUMENTS

| | | | |
|---|---|---|---|
| 54-12990 | 1/1979 | Japan ..................................... 53/536 |
| 7803261 | 2/1979 | Netherlands ........................ 47/1 A |
| 659226 | 10/1951 | United Kingdom ................ 414/417 |

Primary Examiner—Leslie J. Paperner
Attorney, Agent, or Firm—Burns, Doane, Swecker & Mathis

[57] ABSTRACT

Framing system in which plant pot sets (12) are shifted onto a pallet (5) provided with a bottom with holes by means of a roll conveyor (4) extending through the holes in the bottom of the pallet, and in which the pallets filled in this way are stacked.

18 Claims, 5 Drawing Figures

FRAMING SYSTEM

The present invention is concerned with a system in which plant-growing pot cassettes are framed onto pallets, and these pallets are stacked for further transfer.

The framing and transferring of plant-growing pot sets is quite laborious and slow, because, owing to the plants, the pot cassettes cannot be stacked directly one upon the other and because the handling must be quite cautious in order that the soft and flexible pot cassettes with their plants should not be damaged.

The object of the present invention is to provide a rapid and automatic system of framing and stacking of plant pot cassettes, wherein the pot cassettes or plants are, however, not damaged.

In the system in accordance with the invention, pallets are used that are provided with limiters to prevent lowering of the pallet onto the plants on the pallet placed underneath. The pot cassette is framed onto its pallet by means of a roll conveyor, whose rolls extend from underneath through holes provided in the bottom of the pallet to the bottom of the pot cassettes and pull the pot cassettes to their positions on the pallet. When the pallet is full, it is shifted to the lowermost position in the stack of filled pallets.

By means of the method in accordance with the invention, pallets can be framed without damaging the plants but, yet, rapidly and automatically. Moreover, it is easily possible to construct an equipment which, by running it in the opposite direction, can be used for unloading the pot cassettes off the stacked pallets.

Figure 2:
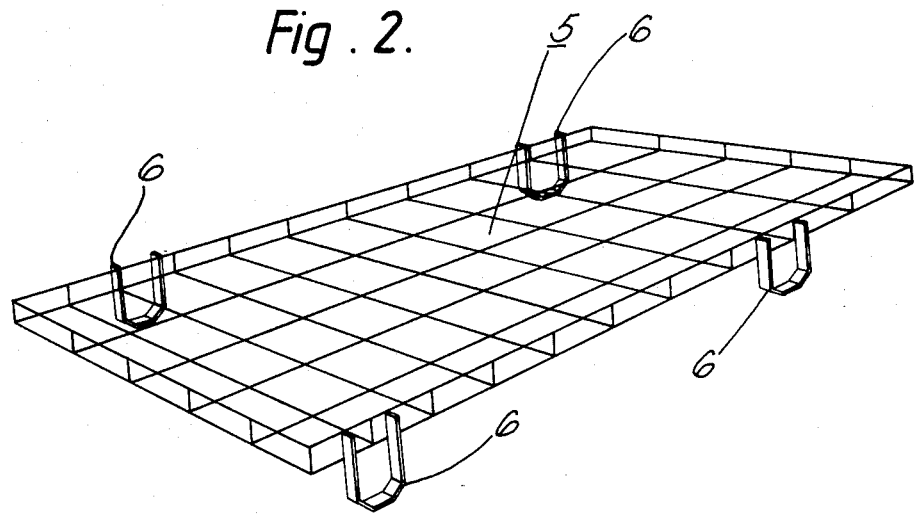
Figure 3:
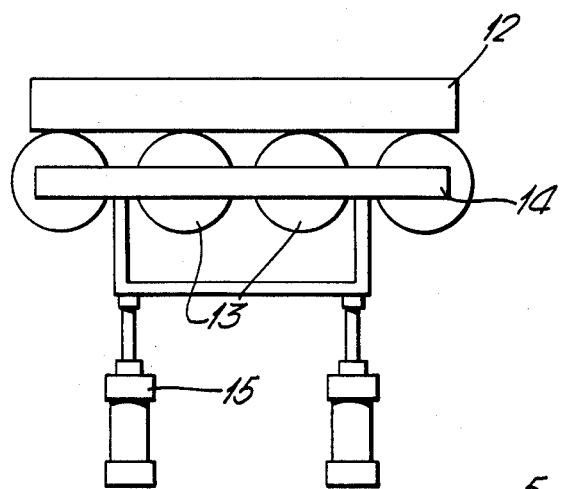
Figure 4:
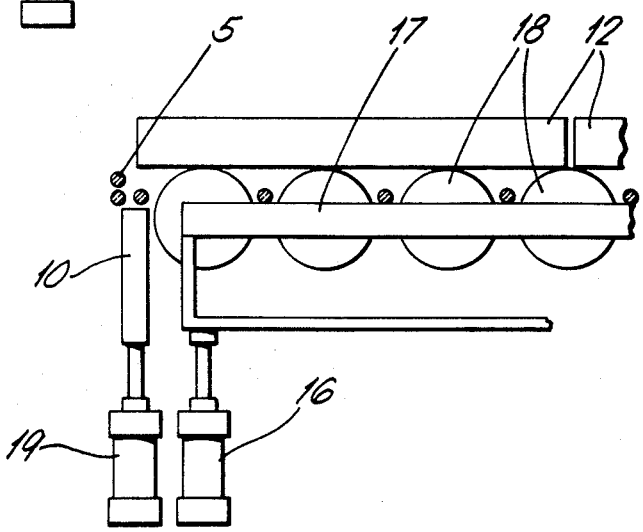
Figure 5:
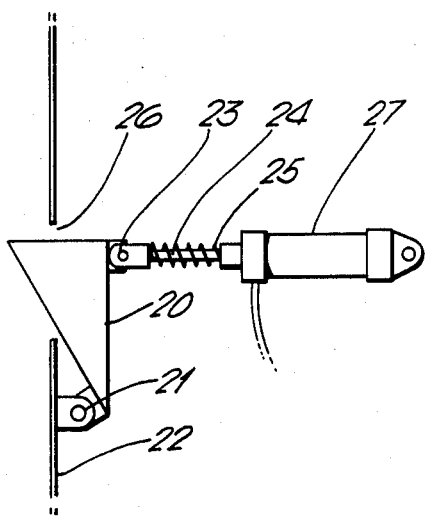

A preferred embodiment of the invention will be illustrated in more detail with the aid of the accompanying drawings. FIG. 1 is a simplified presentation of an equipment by means of which plant pot sets are framed onto pallets and by means of which full pallets are stacked, FIG. 2 shows a pallet used in the equipment, FIGS. 3 and 4 are more detailed views of the raisable conveyors used in the equipment, and FIG. 5 is a more detailed view of a support mechanism used in the equipment.

The pot sets 12 are introduced in the equipment one after the other by means of a conveyor 1 onto the feeding table 2. When the feeding table 2 is full, the line of pot cassettes is shifted off the feeding table by means of a feeder conveyor 3 into the framing station onto the roll conveyor 4, on which a pallet 5 (FIG. 2) is placed so that the rolls of the roll conveyor extend through the bottom of the pallet at least to the level of the edges of the pallet and pull the pot cassettes onto the pallet. The pallet 5 rests on its four legs 6 on a belt conveyor 7 placed at each side of the pallet.

After the pallet 5 has been filled with pot sets, the roll conveyor 4 is lowered and the full pallet 5 is shifted out of the framing station to the stacking station by means of the belt conveyor 7. The stacking station is provided with two lifting means 8, by which the full pallet is raised upwards onto supports 9 positioned against both ends of the pallet. The supports 9 operate as spring-loaded catches, which yield when the pallet 5 rises from below and by-passes the supports.

The framing station is provided with lifting means 10 and supports 11 similar to those provided in the stacking station.

Supported on the supports 11 in the framing station, there are empty pallets 5. After a full pallet 5 has been shifted out of the framing station, the lifting means 10 are raised to the bottom of the pallet placed on the supports 11, the support catches are opened, and the lifting means are lowered so that the lowermost pallet in the stack is lowered onto the belt conveyors 7. After the roll conveyor 4 has been raised to its filling position, the lowered pallet 5 can be filled with pot cassettes.

The filled pallet 5 always pushes the preceding pallet placed in the stacking station on the supports 9 out of its way upwards, and in this way a stack is formed. When the stack is ready, it can be transferred off, e.g., by means of a fork-lift truck.

The feeder conveyor 3 (FIG. 3) includes rotable rolls 13 fitted on a frame 14. The frame 14 with the rolls 13 is displaceable in the vertical direction by means of hydraulic equipment 15. Initially, the feeder conveyor 3 is in its lower position. After the conveyor 1 has brought three pot cassettes 12 onto the feeding table 2, the feeder conveyor is raised to its upper position, and the rolls 13 are allowed to carry the pot cassettes onto the roll conveyor 4 in the framing station.

The roll conveyor 4 (FIG. 4) in the framing station includes a frame 17 raisable by means of the equipment 16, which said frame is provided with rolls 18. Initially, there is a pallet 5 on the roll conveyor 4, and the frame 17 with the rolls 18 is in the upper position so that the rolls extend through the bottom of the pallet to a level slightly higher than the edges of the pallet. The pot cassettes shifted by the feeder conveyor 3 onto the roll conveyor 4 are framed, one row at a time, onto the pallet 5 by means of the roll conveyor 4. After the pallet 5 has been filled, the rolls 18 are lowered, whereby the pallet can be shifted by means of the belt conveyor 7 (FIG. 1) to the stacking station. By means of the hydraulically 19 operated lifting means 10, a new pallet is taken out of the stack placed above the framing position.

FIG. 5 is a more detailed view of the catch supports 9 and 11, which are placed at both ends both of the framing station and of the stacking station. The support comprises a projection 20 of triangular section, which is, at its bottom edge, linked 21 to the end 22 of the framing or stacking station, inside the said end. To the upper portion of the projection 20, likewise inside the end, a rod 24 is linked 23, and around the rod a spring 25, which presses the edge of the projection into the framing or stacking station, respectively, through the opening 26. By means of a control device 27 (e.g. a relay), by the rod 24, the edge of the projection 20 can be pulled against the force of the spring 25 from inside the framing or stacking station, respectively, whereby the pallets 5 can move freely in the vertical direction.

The same equipment can also be used for discharging a stack of pallets full of pot cassettes. In such a case, a full stack is brought into the stacking station and the equipment is connected so that it operates in the reversed direction, whereby the supports 9 and the lifting means 8 take one pallet at a time from the stack for unloading.

Instead of catch supports 9 and 11, it is possible to use, e.g., so-called shelf conveyors on the walls of the framing and stacking stations. They comprise a chain or equivalent circulating around two horizontal shafts fitted one above the other, supports being attached to the said chain or equivalent perpendicularly as appropriately spaced, which said supports become placed against the ends of the pallets 5. The number of shelf conveyors needed is only three, because the shelf conveyor in the partition wall between the stations can shift the pallets simultaneously at one side upwards and at the other side downwards.

What is claimed is:

1. A method of filling pallets with plant pot cassettes comprising the steps of:
   conveying a predetermined number of plant pot cassettes horizontally along a roll conveyor to a first location;
   before said conveying step, feeding pallets individually into position at said first location such that upper portions of rolls of said roll conveyor protrude through holes in said bottom portion of the pallet;
   loading the conveyed cassettes onto the positioned pallet by lowering the roll conveyor relative to the positioned pallet;
   stacking the loaded pallet by shifting said loaded pallet into a stack such that it becomes a lowermost member of the stack; and
   during said stacking step, providing spaces between bottom portions of the stacked pallets with spacer members provided along edges of each pallet, whereby plants in the cassettes of the stacked pallets may grow within the space provided between said stacked pallets.

2. The method as claimed in claim 1, wherein said stacking step includes lifting the loaded pallet upwardly.

3. The method as claimed in claim 2, wherein the lifting of the loaded pallet raises pallets already in the stack.

4. The method as claimed in claim 3, wherein the pallets are raised by their opposite ends by shelf conveyors.

5. The method as claimed in claim 4, wherein said positioning step includes lowering the pallets to be filled onto the roll conveyor from above and the stacking step includes moving the pallet horizontally from said first location.

6. The method as claimed in claim 3, wherein said positioning step includes lowering the pallets to be filled onto the roll conveyor from above and the stacking step includes moving the pallet horizontally from said first location.

7. The method as claimed in claim 2, wherein said positioning step includes lowering the pallets to be filled onto the roll conveyor from above and the stacking step includes moving the pallet horizontally from said first location.

8. The method as claimed in claim 1, wherein said positioning step includes lowering the pallets to be filled onto the roll conveyor from above and the stacking step includes moving the pallet horizontally from said first location.

9. An apparatus for loading pallets with plant pot cassettes, comprising:
   roll conveyor means for conveying a predetermined number of cassettes to a first location along a horizontal path;
   feed conveyor means for feeding cassettes onto said roll conveyor means;
   a plurality of pallets having bottom portions and spacer members so as to be stackable with space provided between bottom portions of the stacked pallets, said bottom portions provided with holes and adapted to receive said plurality of cassettes, whereby plants may grow within the space provided between stacked pallets;
   means for feeding pallets individually into a position at said first location such that upper portions of rolls of said roll conveyor means protrude through said holes;
   means for loading cassettes from said roll conveyor to pallets positioned at said location by lowering said roll conveyor means relative to said pallet positioning means; and
   means for shifting loaded pallets from said first location into a stack such that the shifted pallet becomes lowermost in the stack.

10. The apparatus as claimed in claim 9, wherein the feeding means includes means for supporting pallets in position above the rolls conveyor and means for lowering pallets individually into said position.

11. The use of the equipment as claimed in claim 10 for the discharging of stacked pallets filled with pot cassettes.

12. The apparatus as claimed in claim 9 wherein the shifting means includes means for raising a filled pallet upwardly and means for supporting the raised pallets in their raised positions.

13. The apparatus as claimed in claim 12, wherein said supporting means includes openable catches which engage opposite ends of the pallet.

14. The use of the equipment as claimed in claim 13 for the discharging of stacked pallets filled with pot cassettes.

15. The use of the equipment as claimed in claim 12 for the discharging of stacked pallets filled with pot cassettes.

16. The apparatus as claimed in claim 9, wherein said feed conveyor means includes a first conveyor at a generally right angle to said roll conveyor means and a transfer table for positioning cassettes fed by said first conveyor at a second location along said horizontal path, said conveying means including means for raising and lowering said conveying means from upper and lower positions, said conveying means receiving cassettes positioned on said transfer table when being raised to said upper position.

17. The apparatus as claimed in claim 16, wherein said pallet is a wire basket and said holes are spaces formed between wire members of said basket, said spacer members being positioned at locations along edges of said baskets, spacer members of one basket in a stack engaging spacer members of adjacent baskets in the stack.

18. The apparatus as claimed in claim 17, wherein said shifting means includes a horizontal conveyor which is positioned at said first location so as to receive spacer members of said individually fed pallets so as to support the fed pallet at said position.

* * * * *